(12) United States Patent
Ploeger et al.

(10) Patent No.: US 10,476,343 B2
(45) Date of Patent: Nov. 12, 2019

(54) HEAT SINK FOR AN ELECTRIC MACHINE AND METHOD FOR PRODUCING SAID HEAT SINK

(71) Applicant: Robert Bosch GmbH, Stuttgart (DE)

(72) Inventors: Armin Ploeger, Hildesheim (DE); Birgit Reichert, Salzgitter (DE); Sebastian Stein, Diekholzen (DE); Uwe Knappenberger, Muehlacker (DE); Fabian Lange, Hannover (DE); Camilo Carrillo, Stuttgart (DE); Matthias Roepke, Hildesheim (DE); Karsten Kirchhoff, Lamspringe (DE); Sebastian Bruns, Nordstemmen (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 15/568,583

(22) PCT Filed: Mar. 9, 2016

(86) PCT No.: PCT/EP2016/055062
§ 371 (c)(1),
(2) Date: Oct. 23, 2017

(87) PCT Pub. No.: WO2016/169695
PCT Pub. Date: Oct. 27, 2016

(65) Prior Publication Data
US 2018/0123419 A1 May 3, 2018

(30) Foreign Application Priority Data

Apr. 24, 2015 (DE) .......................... 10 2015 207 538
May 20, 2015 (DE) .......................... 10 2015 209 235

(51) Int. Cl.
*H02K 5/20* (2006.01)
*H02K 9/19* (2006.01)

(52) U.S. Cl.
CPC ...................................... *H02K 5/20* (2013.01); *H02K 9/19* (2013.01)

(58) Field of Classification Search
CPC ............. H02K 5/20; H02K 9/19; F28D 1/047
See application file for complete search history.

(56) References Cited

U.S. PATENT DOCUMENTS

| 5,038,854 A * | 8/1991 | Peterson, III | ........... F28D 1/047 165/125 |
| 8,803,379 B2 * | 8/2014 | Hennings | ................. H02K 5/20 310/54 |

(Continued)

FOREIGN PATENT DOCUMENTS

| DE | 19827333 | 12/1999 |
| DE | 102008027293 | 12/2009 |

(Continued)

OTHER PUBLICATIONS

International Search Report for Application No. PCT/EP2016/055062 dated Jun. 1, 2016 (English Translation, 2 pages).

*Primary Examiner* — Dang D Le
(74) *Attorney, Agent, or Firm* — Michael Best & Friedrich LLP

(57) ABSTRACT

The invention relates to a heat sink (1) for an electric machine, which heat sink has at least one cooling channel (7), which adjoins an interior (3) surrounded by the heat sink (1). The heat sink (1) is characterized in that the heat sink (1) is designed as a single-piece plate (5) bent into a closed ring, in the case of which plate two opposite abutting surfaces (19, 21) are connected to each other in a fluid-tight manner in the region of a joint (17), wherein a plurality of closed channels (7) extend in the plate (5), which channels extend at an angle to the circumferential direction of the ring in such a way that adjacent channels (7) lead into each other in the region of the joint (17) and thus form a continuous, spiral channel, which extends in a plurality of spiral turns from an axially front end (Continued)

(22) to an axially rear end (24) of the annular heat sink (1). In particular, the plate (5) of the heat sink (1) can be economically extruded and then brought into a shape suitable for the heat sink (1) by means of bending and axial offsetting. The heat sink (1) can be produced in a simple and economical manner and enables efficient cooling of an electric machine while requiring a minimal installation space.

14 Claims, 3 Drawing Sheets

(56) References Cited

U.S. PATENT DOCUMENTS

| | | | |
|---|---|---|---|
| 9,461,525 B2 * | 10/2016 | Szinyi | H02K 5/20 |
| 9,525,325 B2 * | 12/2016 | Chamberlin | H02K 9/19 |

FOREIGN PATENT DOCUMENTS

| | | |
|---|---|---|
| DE | 102009051881 | 5/2011 |
| WO | 03100946 | 12/2003 |

\* cited by examiner

HEAT SINK FOR AN ELECTRIC MACHINE AND METHOD FOR PRODUCING SAID HEAT SINK

BACKGROUND OF THE INVENTION

The invention relates to a heat sink for an electric machine and to an electric machine equipped with such a heat sink. The invention further relates to a method for producing the heat sink.

Electric machines of the type used, for example, as electric motors or generators in electric or hybrid vehicles are expected to provide increasingly greater power and power densities. Heat is generated in electric machines as a result of losses occurring during a conversion between electrical energy and mechanical energy, and as a result of other effects. Fluid cooling, in particular liquid cooling, is frequently utilized in order to prevent overheating of the electric machine.

Fluid cooling systems in this case are often formed with the aid of specially designed, for example, double-walled housings, in which a cooling fluid is conveyed through channels or ribs. In this case, the housing adjoins components of the electric machine such as, for example, the stator, and therefore heat can be dissipated from said stator. The manufacturing and/or reliable sealing of housings utilized for cooling can be complex and costly.

A cooling device for an electric machine arrangement is described, for example, in DE 10 2009051881.

SUMMARY OF THE INVENTION

Embodiments of the present invention can advantageously make it possible to provide a heat sink, with the aid of which heat can be efficiently dissipated from an electric machine. The heat sink can be designed in such a way that an installation space for the electric machine can be kept small. In this case, the heat sink can have a simple design and, therefore, inter alia, can be reliable and low-wear. In addition, the heat sink can be easily and economically produced.

According to one first aspect of the invention, a heat sink for an electric machine is proposed, which comprises at least one cooling channel which adjoins an inner chamber surrounded by the heat sink. The heat sink is characterized in that said heat sink is designed as a single-piece plate bent into a closed ring, in which two abutting surfaces positioned opposite each other are connected to each other in a fluid-tight manner in the region of a joint. A plurality of closed channels extends in the plate, which extend diagonally with respect to the circumferential direction of the ring in such a way that adjacent channels lead into each other in the region of the joint and thus form one continuous, spiral channel which extends in multiple spiral turns from an axially front end to an axially rear end of the annular heat sink.

According to one second aspect of the invention, a method for producing a heat sink for an electric machine is described, which is distinguished by the following steps: a plate, in which multiple closed channels extend adjacently to one another, is initially provided. The plate is then bent in such a way that said plate forms a ring in which two end faces of the plate are positioned opposite each other, as abutting surfaces, in the region of a joint. The two abutting surfaces of the plate, which are positioned opposite each other, are then displaced relative to each other in the axial direction in such a way that adjacent channels lead into each other in the region of the joint and thus form one continuous, spiral channel which extends in multiple spiral turns from an axially front end to an axially rear end of the annular heat sink. The two abutting surfaces of the plate, which are positioned opposite each other, are then connected to each other in a fluid-tight manner.

Ideas regarding embodiments of the present invention can be considered, inter alia, to be based on findings and concepts described in the following.

The heat sink described can have a very simple design and can be easily produced. Essentially, the heat sink can consist of only one plate which is provided with suitable channels and is bent in a suitable manner. End faces of the plate can be positioned opposite each other, as abutting surfaces, after the plate is bent, and therefore said end faces can be connected to each other in the form of a type of a joint. Before the abutting surfaces are connected, the plate can be twisted in such a way that the end faces of the plate, which are positioned opposite each other, are offset with respect to one another in the axial direction. As a result, the channels do not extend precisely in the circumferential direction of the plate, which has preferably been bent to form a cylinder, but rather slightly diagonally with respect to this circumferential direction. Each end region of one channel therefore does not enter into a starting region of the same channel. Instead, one end region of a channel leads into a starting region of an adjacent channel, the end region of which, in turn, leads into a starting region of a channel adjacent thereto, etc. Overall, the channels disposed next to one another in the plate therefore successively transition into one another, and therefore one continuous channel forms, which extends in multiple spiral turns from an axially front end to an axially rear end of the annular heat sink. The cooling channel extends through the heat sink, covering a large surface area, and therefore heat generated, for example, in a stator of an electric machine, which is accommodated in the inner chamber surrounded by the heat sink and adjoins an inner surface of the heat sink, can be efficiently dissipated. The heat sink can therefore be very simply designed and produced.

The plate used for the heat sink can be initially provided as a flat plate, for example, before said plate is then shaped into a cylindrical annular shape, for example.

The channels can be formed in the plate as tubular, elongate cavities. Cooling fluid, which enters the channel on one side, is therefore conveyed up to the end of the channel on the opposite side.

The plate having the channels extending therein can be formed, for example, as an extruded part. In other words, the plate, including the channels extending therein, can be produced by extrusion molding. Extrusion molding can be considered to be a forming method for producing bars, wires, pipes, and irregularly shaped, prismatic profiles such as the plate used for the heat sink, for example. This is described, inter alia, in DIN 8582 and DIN 8583. In extrusion molding, in general, a block heated to a shaping temperature is pressed through an extruder head using a ram. An outer shape of an extruded part is determined by the extruder head. Cavities can be generated by means of punches having different shapes. Extruded parts typically achieve a length of up to 60 m. In principle, all metals are suitable for extrusion molding. Advantages of extrusion molding are, in particular, a high level of shaping that can be achieved in one method step, and low tool costs.

The plate used for the heat sink can consist of aluminum, for example. Aluminum has high heat conductivity and can be easily shaped, for example, by means of extrusion molding.

Every channel can have two channel ends, one of which leads into one of the abutting surfaces and the other of which leads into the other abutting surface.

At least one channel opening of a channel provided in the first abutting surface can be fluidically connected to a channel opening of another, adjacent channel provided in the second abutting surface, and can partially or completely overlap therewith.

With respect to each abutting surface, a channel opening of an axially outer channel can form an inlet or an outlet of the continuous, spiral channel.

The two abutting surfaces of the plate, which are positioned opposite each other, can be bonded to one another along the joint. A bonded connection can ensure, in particular, that there is a fluid-tight connection of the abutting surfaces of the plate, which are positioned opposite each other, and therefore cooling fluid at the end of a channel of the plate can be conveyed into the beginning of an adjacent channel without a loss. A bonded connection can be implemented, for example, by means of welding, soldering, glueing, or the like. A connection between the abutting surfaces, which is tight and is stable for the long term, can be created in the region of the joint, in particular, by welding the abutting surfaces positioned opposite each other. Different welding methods can be used, wherein laser welding appears to be particularly advantageous in terms of flexible processing possibilities and short process times.

The channels in the plate can extend in parallel to one another and/or in parallel to an edge of the plate. In such an embodiment, the plate can be easily produced, in particular, by extrusion molding. Adjacent channels can have a fixed lateral spacing in relation to each other in this case and are separated from each other by a wall region which extends between the adjacent channels.

In this case, it can be considered advantageous when adjacent channels are laterally separated from each other by less than 1 cm, preferably less than 0.5 cm. In this case, each of the channels can have a corresponding width which is smaller than the lateral spacing between channels, for example, a width of less than 0.8 cm or less than 0.4 cm. Given that the channels have a small width and are laterally separated from each other only slightly, it can suffice during production of the heat sink to displace the two end faces of the plate, which are positioned opposite each other, relative to each other in the axial direction only slightly, i.e., for example, by less than 1 cm or less than 0.5 cm, in order to ensure that adjacent channels lead into each other in the region of the abutting surfaces and thus form one continuous, spiral channel. Such a slight axial displacement of the end faces prevents the occurrence of excess mechanical strain within the plate, which could otherwise endanger the integrity of the plate or the joint connection in the region of the end faces.

It is noted that some of the possible features and advantages of the invention are described herein with reference to different embodiments. A person skilled in the art recognizes, for example, that features of the heat sink can be suitably combined, adapted, or exchanged, or can be converted into corresponding method features, and vice versa, in order to arrive at further embodiments of the invention.

BRIEF DESCRIPTION OF THE DRAWINGS

In the following, embodiments of the invention are described with reference to the attached drawings, wherein neither the drawings nor the description should be interpreted as limiting the invention.

The figures are merely schematic and are not true to scale. The same reference signs designate identical or identically acting features in the figures.

DETAILED DESCRIPTION

Figure 1:
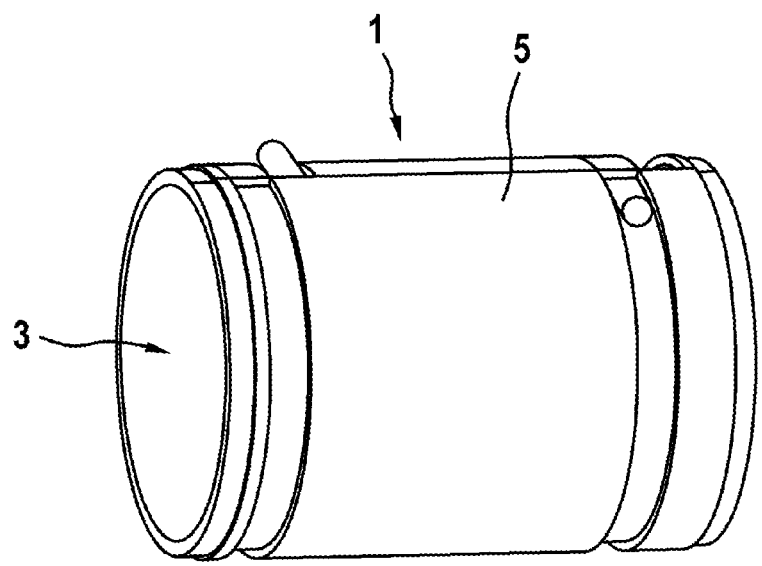
FIG. 1 shows a perspective view of a heat sink according to one embodiment of the invention.
Figure 2:
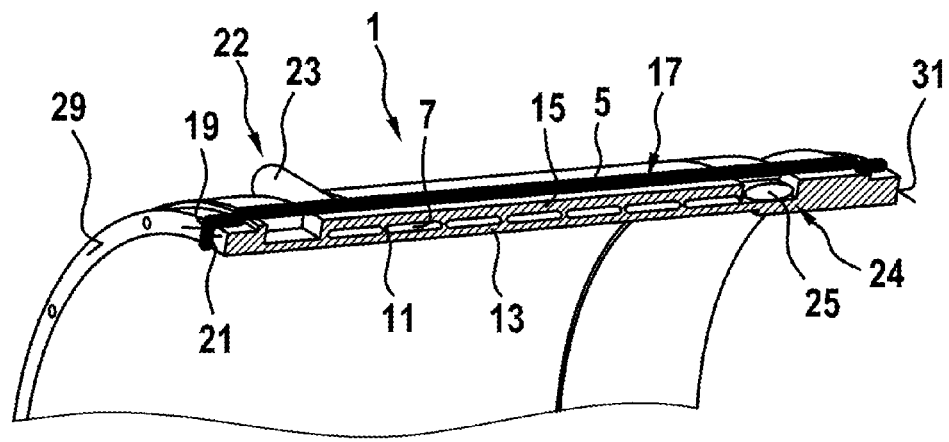
FIG. 2 shows a partially cutaway partial view of the heat sink in FIG. 1.
Figure 3:
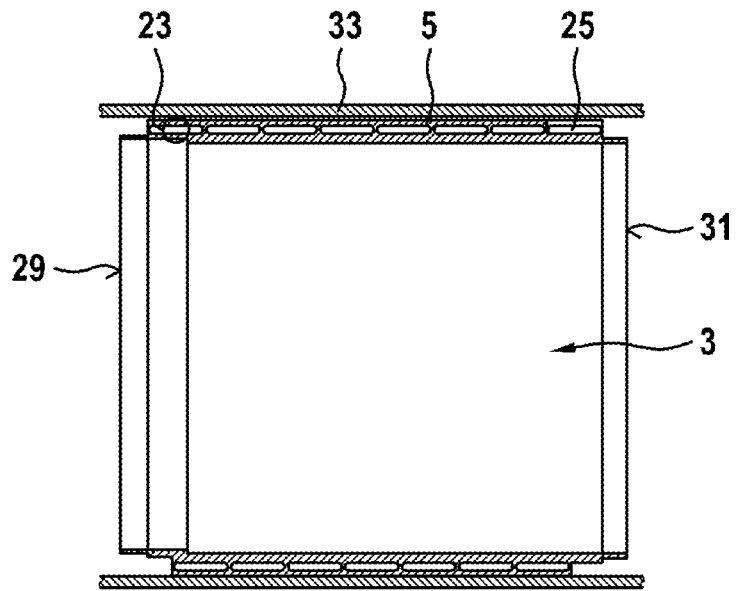
FIG. 3 shows an isometric sectional view through a heat sink according to one embodiment of the invention.

FIGS. 1, 2 and 3 show a perspective view, a partially cutaway view, and a sectional view of a heat sink 1 according to one embodiment of the invention. The heat sink 1 has a cylindrical shape. A cylinder diameter can be suitably selected in order to enable, for example, a stator of an electric machine (not shown) to be accommodated in an inner chamber 3 of the heat sink 1. The cylinder diameter can be between 2 cm and 100 cm, preferably between 5 cm and 40 cm, for example. An axial length of the heat sink can typically be between 5 cm and 200 cm, preferably between 10 cm and 50 cm.

Figure 4:
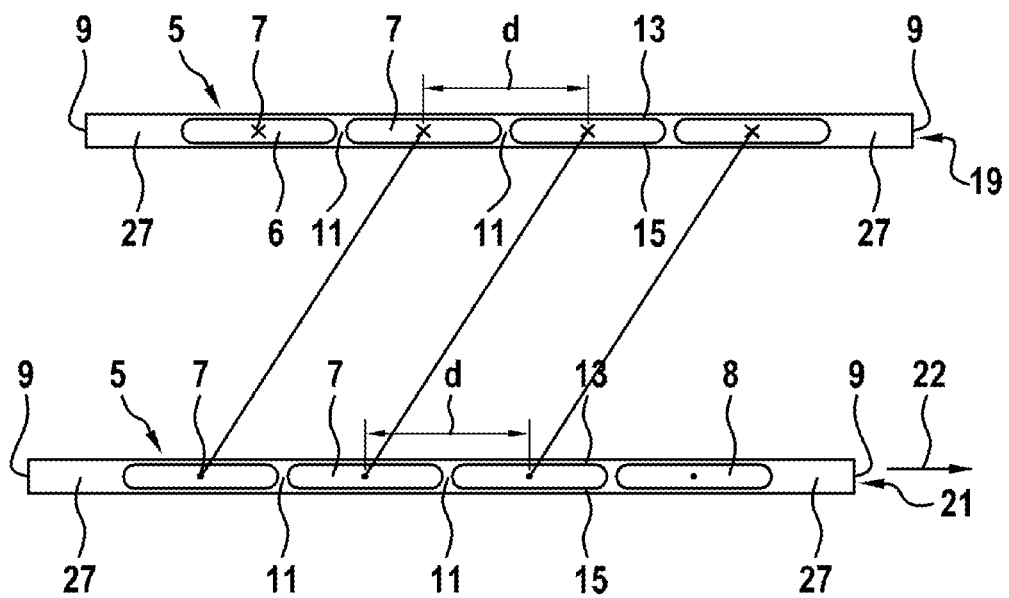
FIG. 4 shows a lateral top view of end faces of a plate for a heat sink according to one embodiment of the invention.

The heat sink 1 can be formed with the aid of a plate 5; a sectional view of two abutting surfaces 19, 21 of said plate, which are located on end faces positioned opposite each other, is shown in FIG. 4. The plate 5 can be initially flat. Said plate can have a thickness, for example, between 0.5 cm and 20 cm, preferably between 1 cm and 5 cm. The plate 5 can consist of a thermally highly conductive material, in particular a metal, preferably aluminum, copper, iron or the like, or alloys thereof.

A plurality of channels 7 are formed in the plate 5. The channels 7 extend straight within the plate 5 and in parallel to one another and in parallel to lateral edges 9 of the plate 5. Channels 7 located next to one another are separated from one another by intermediate walls 11. A center distance d between adjacent channels is less than 1 cm. The intermediate walls 11 can have a width of, for example, less than 1 cm. Walls 13, 15, which simultaneously form externally exposed surfaces of the plate 5 and delimit the channels 7 toward the top and the bottom, can have a thickness, for example, between 0.3 cm and 3 cm. The channels 7 can have a cross-section which is rectangular, oval, round, or of any other shape.

Located adjacent to each of the lateral edges 9 is a region 27 having additional material, and therefore a fastening to further flanges can be made possible there, in the installed state of the heat sink 1. Furthermore, front and rear surfaces 29, 31, respectively, of the heat sink 1 can be processed in the region 27 of the edges 9, in order to have said surfaces extend in parallel to one another, for example.

Figure 5:
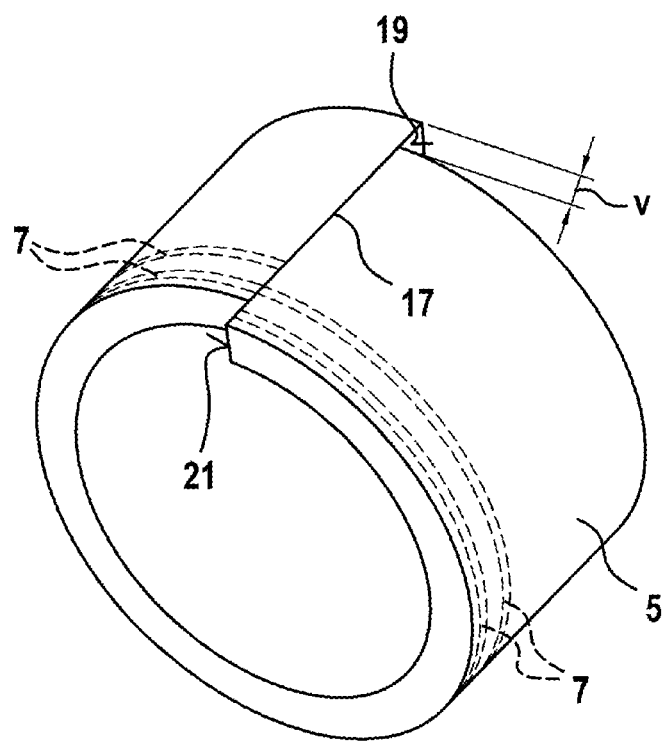
FIG. 5 illustrates an axial offset of a plate, which has been bent to form a ring, for a heat sink according to one embodiment of the invention.

In order to form the heat sink 1 from the flat plate 5 provided with channels 7, the flat plate 5 is initially brought into a cylindrical shape within the scope of a bending process. The plate 5 is initially cut to a length, in this case, that corresponds to the circumference of the desired cylindrical shape. The plate is then bent through 360°, until end faces of the plate 5, which function as abutting surfaces 19, 21, are positioned opposite each other in the region of a joint 17. The plate 5 is subsequently twisted in one direction 22 in such a way that the two abutting surfaces 19, 21 positioned opposite each other are offset relative to one another in the axial direction, as illustrated in FIG. 4 and FIG. 5. An offset v is selected in this case in such a way that one end of a channel 7 leads into a beginning of an adjacent, other channel 7. In other words, an axial offset of the channels 7 occurs at the end and at the beginning of the plate 5 to the right or to the left around a cavity. Finally, the two abutting surfaces 19, 21 are connected to each other in the region of the joint 17. For this purpose, the abutting surfaces 19, 21 can be welded to one another, for example, at the joint 17. Channel openings 6, 8 of axially outer channels 7 can form an inlet and an outlet, respectively, to the continuous, spiral channel located therebetween.

The front faces of the hollow-cylindrical heat sink 1 undergo secondary machining before or after the welding of the abutting surfaces 19, 21 in such a way that planar end faces or front faces result. The uneven front faces of the hollow-cylindrical heat sink 1, which are formed via the axial offset v and have a stepped projection, are therefore subsequently reworked to form even front faces.

Every channel 7 therefore has two channel ends, one of which leads into the abutting surface 19 and the other of which leads into the other abutting surface 21. At least one channel opening of a channel 7 provided in the first abutting surface 19 is fluidically connected to a channel opening of another, adjacent channel provided in the second abutting surface 21, and partially or completely overlaps therewith. With respect to each abutting surface, a channel opening of an axially outer channel therefore forms an inlet or an outlet of the continuous, spiral channel.

As a result of the bending around the central longitudinal axis and the axial displacement of the plate 5, the channels 7 lead into one another in such a way that one continuous, spiral channel forms, which extends in multiple spiral turns from an axially front end 22 to an axially rear end 24 of the annular heat sink 1. Inlets and outlets 23, 25, which may need to be sealed in a specific manner, are provided at the ends 22, 24.

The heat sink 1 formed in this way can be machined on its radially inner surface, for example, by turning, in particular in order to calibrate said heat sink or to adjust said heat sink in such a way that, for example, a stator of the electric machine can be accommodated therein in a well-fitting manner with mechanical and thermal contact.

The heat sink 1 can be accommodated in a housing 33 which surrounds the electric machine.

The heat sink 1 described herein can be produced in a simple and economical manner and enables efficient cooling of an electric machine while requiring minimal installation space.

Finally, it is pointed out that terms such as "comprising", "having", etc., do not rule out any other elements or steps, and terms such as "one" do not rule out a plurality. Reference signs in the claims are not considered to be a limitation.

The invention claimed is:

1. An annular heat sink (1) for an electric machine, the heat sink comprising at least one cooling channel (7) which adjoins an inner chamber (3) surrounded by the heat sink (1),
   wherein the heat sink (1) is a single-piece plate (5) bent into a closed ring, in which first and second abutting surfaces (19, 21), which are positioned opposite each other, are connected to each other in a fluid-tight manner in the region of a joint (17),
   wherein a plurality of closed channels (7) extend in the plate (5) from the first abutting surface (19) to the second abutting surface (21), and
   wherein the abutting surfaces (19, 21) are offset with respect to one another in an axial direction in such a way that adjacent channels (7) lead into each other in a region of the joint (17) and thus form one continuous, spiral channel which extends in multiple spiral turns from an axially front end (22) to an axially rear end (24) of the annular heat sink (1).

2. The heat sink as claimed in claim 1, wherein the plate (5) with the channels (7) extending therein is formed as an extruded part.

3. The heat sink as claimed in claim 1, wherein the plate (5) consists of aluminum.

4. The heat sink as claimed in claim 1, wherein each channel (7) has two channel ends, one of which leads into one of the abutting surfaces (19, 21) and another of which (21) leads into the other abutting surface (21, 19).

5. The heat sink as claimed in claim 1, wherein at least one channel opening of a channel (7) provided in the first abutting surface (19) is fluidically connected to a channel opening of another, adjacent channel provided in the second abutting surface (21), and partially or completely overlaps therewith.

6. The heat sink as claimed in claim 1, wherein, with respect to each of the abutting surfaces (19, 21), a channel opening of an axially outer channel (7) forms an inlet (6) or an outlet (8) of the continuous, spiral channel.

7. The heat sink as claimed in claim 1, wherein the abutting surfaces (19, 21) of the plate (5), which are positioned opposite each other, are bonded to one another along the joint (17).

8. The heat sink as claimed in claim 1, wherein the channels (7) extend in parallel to one another and/or in parallel to an edge (9) of the plate (5).

9. The heat sink as claimed in claim 1, wherein adjacent channels (7) are laterally separated from each other by less than 1 cm.

10. The heat sink as claimed in claim 1, wherein the abutting surfaces (19, 21) of the plate (5), which are positioned opposite each other, result in planar front faces of the heat sink (1).

11. An electric machine, comprising:
   a stator,
   a rotor, and
   a heat sink (1) as claimed in claim 1 surrounding the stator.

12. A method for producing a heat sink (1) for an electric machine as claimed in claim 1, the method comprising the following steps:
   providing a plate (5) in which multiple closed channels (7) extend adjacently to one another;
   bending the plate (5) in such a way that said plate forms a ring in which two end faces of the plate (5) are positioned opposite each other, as two abutting surfaces (19, 21), in a region of a joint (17);
   displacing the two abutting surfaces (19, 21) of the plate (5), which are positioned opposite one another, relative to each other in an axial direction, in such a way that adjacent channels (7) lead into each other in the region of the abutting surfaces (19, 21) and thus form one continuous, spiral channel which extends in multiple spiral turns from one axially front end (22) to an axially rear end (24) of the annular heat sink (1); and
   connecting the two abutting surfaces (19, 21) of the plate, which are positioned opposite each other, in a fluid-tight manner.

13. The method as claimed in claim 12, wherein the plate (5) is produced by extrusion molding.

14. The method as claimed in claim 12, wherein the two abutting surfaces (19, 21) of the plate (5), which are positioned opposite each other, are connected to each other by welding.

\* \* \* \* \*